US007573897B2

(12) United States Patent
Elmoalem et al.

(10) Patent No.: US 7,573,897 B2
(45) Date of Patent: Aug. 11, 2009

(54) METHOD AND GRANT SCHEDULER FOR CYCLICALLY ALLOCATING TIME SLOTS TO OPTICAL NETWORK UNITS

(75) Inventors: Eli Elmoalem, Niti (IL); Yehiel Angel, Tserufa (IL); David A Vishai, Nes Ziona (IL)

(73) Assignee: Broadlight, Ltd., Ramat-Gan (IL)

( * ) Notice: Subject to any disclaimer, the term of this patent is extended or adjusted under 35 U.S.C. 154(b) by 697 days.

(21) Appl. No.: 11/107,906

(22) Filed: Apr. 18, 2005

(65) Prior Publication Data

US 2006/0233197 A1 Oct. 19, 2006

(51) Int. Cl.
*H04L 12/63* (2006.01)
(52) U.S. Cl. ...................... 370/458; 370/468
(58) Field of Classification Search .......... 370/468, 370/464, 395, 395.51, 351, 431, 442, 444, 370/455, 458, 471, 395.41, 395.4
See application file for complete search history.

(56) References Cited

U.S. PATENT DOCUMENTS

2001/0052029 A1* 12/2001 Harbin ................. 709/251
2003/0123482 A1* 7/2003 Kim et al. .............. 370/468
2004/0109689 A1* 6/2004 Song et al. .............. 398/69
2004/0213286 A1* 10/2004 Jette et al. .............. 370/466
2004/0258094 A1* 12/2004 Bashan et al. .......... 370/486
2006/0018322 A1* 1/2006 Oron ................... 370/395.1
2007/0140258 A1* 6/2007 Tan et al. ............. 370/395.21
2008/0025725 A1* 1/2008 Jette et al. ................ 398/71

* cited by examiner

*Primary Examiner*—Brenda Pham
(74) *Attorney, Agent, or Firm*—Myers Wollin, LC (57) ABSTRACT

A grant scheduler and method for cyclically allocating time slots to traffic container (T-CONTs) included in one or more optical network units (ONUs) for transmitting respective data based on known respective service level agreements for each T-CONT. A first processing unit allocates fixed time slots in a current cycle to a fixed subset of T-CONTs and a second processing unit determines bandwidth demand for each T-CONT in a non-fixed subset of T-CONTs based on a dynamic bandwidth allocation input. A bandwidth allocation unit is coupled to the first processing unit and to the second processing unit for dynamically allocating time slots in the current cycle to the non-fixed subset of T-CONTs based on the determined bandwidth demand and bandwidth availability.

25 Claims, 5 Drawing Sheets

METHOD AND GRANT SCHEDULER FOR CYCLICALLY ALLOCATING TIME SLOTS TO OPTICAL NETWORK UNITS

FIELD OF THE INVENTION

This invention relates to dynamic bandwidth allocation in passive optical networks.

BACKGROUND OF THE INVENTION

A passive optical network (PON) comprises an optical line terminal (OLT) system connected to multiple optical network unit (ONU) systems in a point-to-multi-point network. New standards have been developed to define different types of PONs, each of which serves a different purpose. For example, the PONs known in the related art include a BPON, an EPON, and a GPON, and others.

Figure 1:
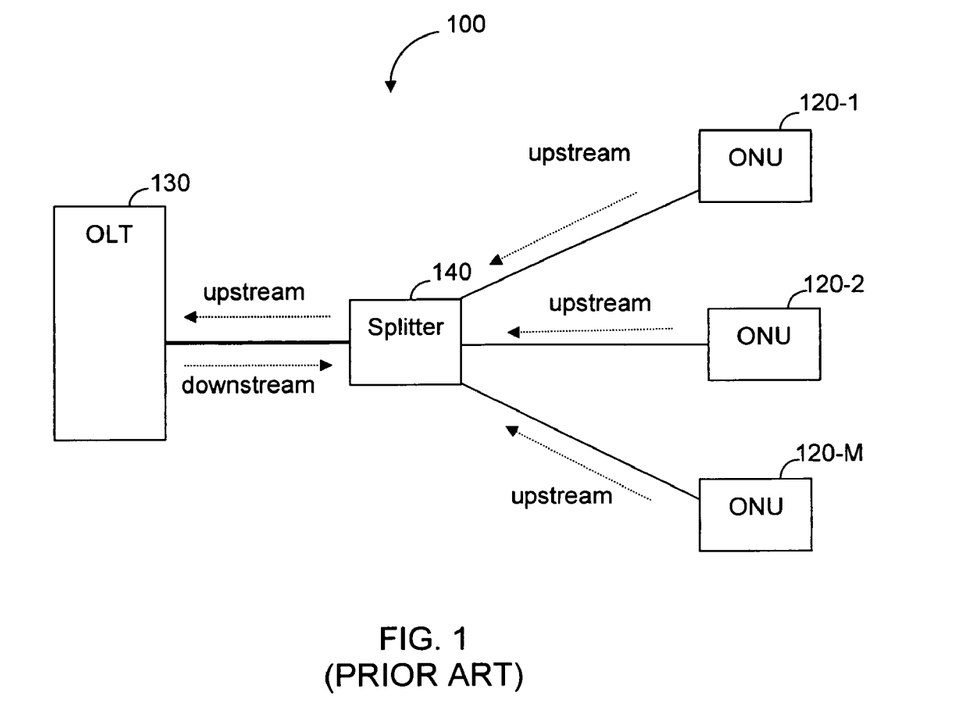
FIG. 1 is a schematic representation of a point to multi-point passive optical network (PON)

An exemplary diagram of a typical PON 100 is schematically shown in FIG. 1. The PON 100 includes a number M of ONUs 120-1, 120-2 ... 120-M coupled to an OLT 130 via a passive optical splitter 140. Since all ONUs function in like manner, they will be collectively referred to by the reference numeral 120 in the following description unless reference is made to a specific ONU. Traffic data transmission may be achieved using ATM cells over two optical wavelengths, one for the downstream direction and another for the upstream direction. Thus, downstream transmission from the OLT 130 is broadcast to all the ONUs 120. Each ONU 120 filters its respective data according to, for example, pre-assigned ATM VPI/VCI values.

The OLT 130 includes a transmitter (not shown) for transmitting downstream data to the ONUs 120 and a receiver (not shown) for receiving upstream data sent to OLT 130 from ONUs 120. OLT 130 broadcasts data to the ONUs 120 along a common channel so that all the ONUs 120 receive the same data. On the other hand, each of ONUs 120 transmits respective data to the OLT 130 during different time slots allocated by the OLT 130. To this end, the OLT 130 must allocate bandwidth to the ONUs 120 and specify when, during a complete cycle in which upstream data is sent from the ONUs 120 to the OLT 130, each ONU may transmit. Obviously, the more time slots allocated to an ONU, the greater is the bandwidth allocation thereto.

Figure 2:
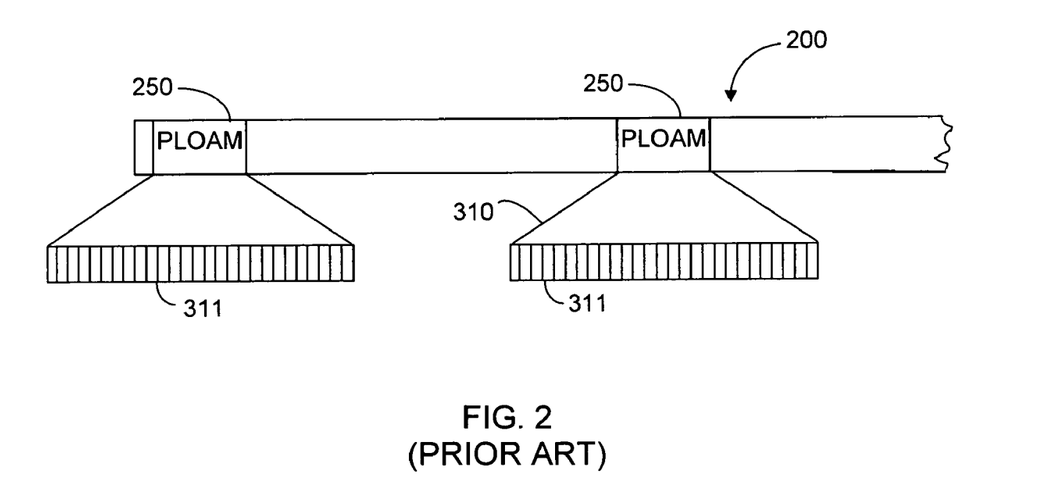
FIG. 2 is a schematic representation of a downstream frame transmitted by an OLT to ONUs in the optical network shown in FIG. 1.

In accordance with the BPON standard (G.983.1), the downstream channel is divided into frames with fixed-size transmission time slots. The downstream frame includes the physical layer operation administration and maintenance (PLOAM) channel, in which PLOAM cells are transmitted to ONUs 120 from OLT 130. Downstream PLOAM cells include the grants of the upstream frames. The grants control the upstream transmission, namely an OAM process assigns grant-IDs to traffic containers (T-CONTs, which are logical upstream channels within ONUs), and so ONUs 120 can transmit data at the allocated slots according to the grant values in the PLOAM cells. FIG. 2 shows schematically a downstream frame 200 transmitted by the OLT 130 to ONUs 120. Frame 200 includes PLOAM cells 250 in predefined slots. Each of the PLOAM cells 250 includes a grant map 310 where each grant is allocated to a single upstream time slot 311. Grant maps 310 together form a grant vector 300 schematically shown in FIG. 3.

Figure 3:
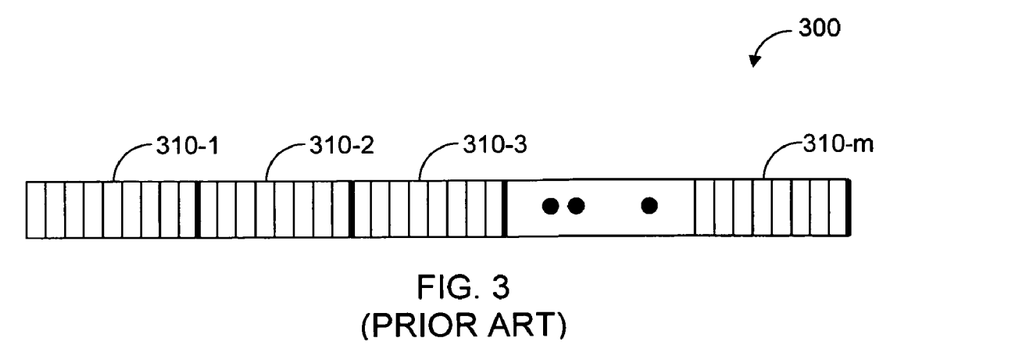
FIG. 3 is a schematic representation of a grant vector determining when each ONU may transmit data to the OLT in the optical network shown in FIG. 1.

In accordance with the BPON standard (G.983.1), a 155 Mb/s downstream frame (e.g. frame 200) has 56 slots, of which slots 1 and 29 are PLOAM cells. The two PLOAM cells contain first and second grant maps respectively. The first PLOAM cell includes a grant map which contains 27 time allocation slots and the second PLOAM cell includes a grant map which contains 26 time allocation slots, thus making a grant vector of 155 Mb/s upstream frame, with a total of 53 time allocation slots. Each ONU 120 receives the grant vector (e.g., vector 300) and decodes its grant maps (e.g., maps 310) in order to determine during which allocation slots it may convey data to the OLT.

In the related art, there are two essentially different mechanisms for allocating time slots to an ONU in different PON technologies. In one mechanism, the OLT sends to the ONUs a grant-map containing multiple grants each representing a single upstream time-slot, during which a respective ONU may transmit data. An alternative mechanism is where each ONU 120 is provided by the OLT 130 with the number of an upstream time slot when it may initiate transmission and the number of consecutive time slots during which such transmission may continue. These two different approaches amount to the same thing and the invention is suitable for use with either.

The various types of PON include a mechanism for dynamic bandwidth allocation (DBA) which allows upstream bandwidth in a PON to be dynamically shared between participating ONUs. The DBA further allows maximizing the bandwidth utilization of bandwidth allocated to the ONUs 120 and providing a better flow control at the OTL 130. The bandwidth allocation is performed by means of the T-CONTs, which are upstream traffic flows within the ONU, to which the OLT grants bandwidth.

A T-CONT is a virtual upstream channel to which bandwidth is granted by the OLT. A single T-CONT can be allocated for an ONU, a class of service (CoS), or a logical ONU. A single ONU may have one or more T-CONTs. There are several types of T-CONTs, each serving a different class of bandwidth allocation. Specifically, the bandwidth allocation for a T-CONT may fall into one of five different types: a) fixed, where a reserved upstream bandwidth is cyclically allocated regardless of demand, b) assured, where bandwidth may not be given without demand, c) non-assured, where bandwidth is given only if it is available but is not guaranteed, d) best effort, or e) any combination thereof. A demand for bandwidth is met only if remaining upstream bandwidth is available. Regardless of how non-fixed bandwidth is allocated during a given grant cycle, the total bandwidth allocated to all channels of the T-CONT cannot exceed a predetermined maximum bandwidth that is a property of the T-CONT.

DBA is performed using two different techniques: a status report dynamic bandwidth allocation (also referred to as a "SR-DBA") and a predictive dynamic bandwidth allocation (also referred to as "non SR-DBA"). The SR-DBA defines a messaging protocol whereby the ONUs 120 report the queue status of each of their T-CONTs to the OLT 130. By such means, the OLT 130 is periodically informed during successive grant cycles of the actual bandwidth usage of the ONUs employing this mechanism and is better able to allocate sufficient resources to ONUs 120 during subsequent grant cycles. A queue-status report indicates the amount of bandwidth requested by a T-CONT within an ONU 120. Once the OLT 130 allocates grants to an ONU 120, the ONU 120 responds by sending data cells or idle cells in the corresponding timeslots. This information is referred to as the actual usage data.

While the SR-DBA provides a vehicle for dynamically allocating bandwidth during successive grant cycles based on actual traffic demand reported during the previous cycle, it imposes a minimum processing time that adds to the overall OLT response time. This processing time derives from two factors: first, the ONUs 120 need to report their current bandwidth needs to the OLT 130 and secondly the OLT 130 must process the received data in order to allocate new time slots to the ONUs 120 during the next grant cycle and convey them to the ONUs 120. The time taken to report bandwidth needs and convey new time slots is dependent, inter alia on the distance between the OLT 130 and the ONUs 120, and on the required processing time. All of these tasks take time and impose a minimum response time between ONUs 120 reporting their current usage and receiving fresh allocations. This overhead becomes more significant as more traffic is conveyed.

The predictive DBA (or non SR-DBA) technique discussed in the related art is based on monitoring IDLE-cell transmitted by ONUs 120. According to this technique, the OLT 130 tracks ONUs' 120 bandwidth usage patterns, and thus ONUs 120 do not need to report anything back to the OLT 130. The OLT 130 counts actual bandwidth (i.e., non-IDLE cells) used by each ONU 120, and based on this information the OLT 130 predicts the bandwidth needs of the ONUs 120. The advantages of such technique is that they simplify the ONU system, avoid potential interoperability problems between OLT and ONU systems (due to messaging incompatibilities), and reduce ONU complexity since there is no need to support divided-cells and status-reports.

The present invention provides an improved grant scheduler unit that utilizes both predictive (non status reporting) and status reporting dynamic bandwidth allocation mechanisms described in the related art.

SUMMARY OF THE INVENTION

It is an object of the invention to provide an improved grant scheduler unit and method supporting both fixed and dynamic bandwidth allocation, combining both types of T-CONTs with either SR-DBA or non SR-DBA.

Such an object is realized in accordance with a first aspect of the invention by a method for cyclically allocating time slots to a plurality of traffic containers (T-CONTs) each included in one or more optical network units (ONUs) for transmitting respective data based on known respective service level agreements for each of said T-CONTs, said method comprising:

allocating fixed time slots in a current cycle to a fixed subset of T-CONTs;

receiving at least one of a status report and usage information relating to a non-fixed subset of T-CONTs;

determining bandwidth demand for each T-CONT in said non-fixed subset of T-CONTs based on said at least one of said status report and said usage information;

dynamically allocating time slots in the current cycle to said non-fixed subset of T-CONTs based on bandwidth availability and the determined bandwidth demand; and combining said fixed allocated time slots and the dynamically allocated time slots into a grant vector.

In accordance with a second aspect of the invention, there is provided a grant scheduler for cyclically allocating time slots to a plurality of traffic containers (T-CONTs) included in one or more optical network units (ONUs) for transmitting respective data based on known respective service level agreements for each of said T-CONTs, said grant scheduler comprising:

a first processing unit for allocating fixed time slots in a current cycle to a fixed subset of T-CONTs;

a second processing unit for determining bandwidth demand for each T-CONT in a non-fixed subset of T-CONTs based on a dynamic bandwidth allocation input;

a bandwidth allocation unit coupled to said first processing unit and to said second processing unit for dynamically allocating time slots in the current cycle to said non-fixed subset of T-CONTs based on the determined bandwidth demand and bandwidth availability; and a grant dispersion unit for combining said fixed allocated time slots and the dynamically allocated time slots into a grant vector.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EXEMPLARY EMBODIMENTS

Figure 4:
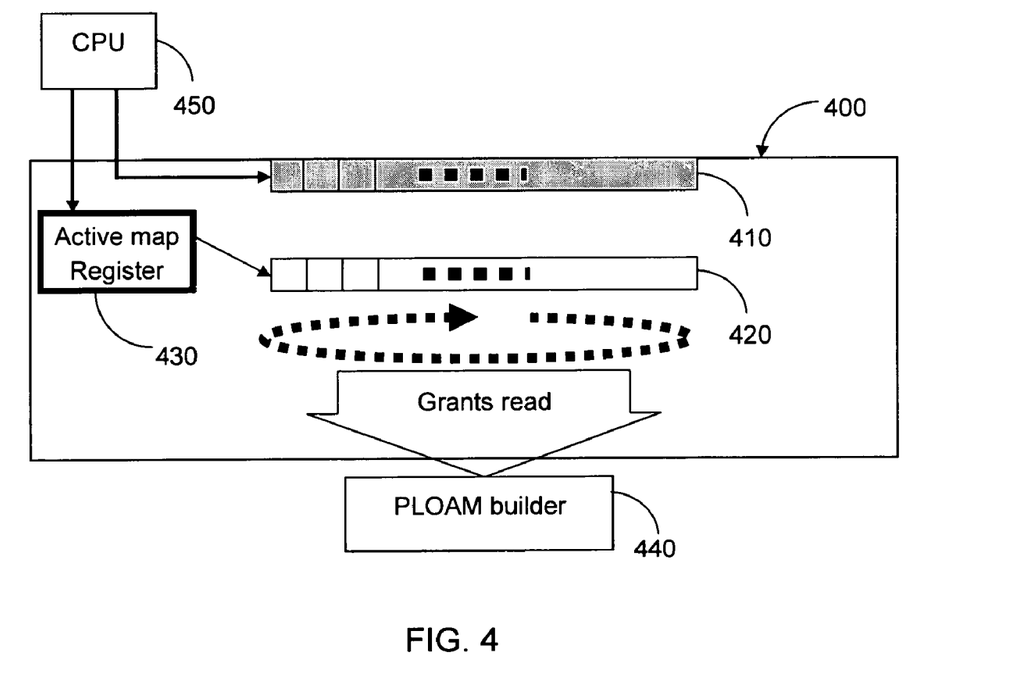
FIG. 4 is a schematic representation showing a detail of a grant scheduler according to the invention.

Referring to FIG. 4, there is shown schematically a detail of a grant scheduler 400 according to one embodiment of the present invention. Grant scheduler 400 serves the function of configuring the grant vector, as depicted in FIG. 3, for successive grant cycles. Grant scheduler 400 includes grant maps 410 and 420, and an active map register 430. The allocation of time slots updated by a CPU 450 are fed to one of a pair of grant maps 410 and 420. The time of a grant cycle is defined by the grant-map size, which is a programmable parameter. Active map register 430 indicates which of the two grant maps 410 and 420 is active and is currently used by PLOAM builder 440, the other one operating on standby. At any point of time, one of the grant maps 410 and 420 is in active state, and the other is in standby state. When all relevant CPU updates have been fed to the standby grant map 420, the active and standby grant maps 410 and 420 are switched by a CPU command to the active map register 430, and the information contained in the previously-standby-now-active grant map 420 is processed by a PLOAM builder 440. The active grant map 420 is continuously read by the PLOAM builder 440, and therefore the same grants are sent over and over again, creating a static allocation scheme. While the active map 420 content is processed by the PLOAM builder 440, the active map register 430 can be used for swapping between the active and standby grant maps so that further incoming CPU 450 updates are routed to the standby grant map during the previous grant cycle but is earmarked as the active grant map for the next grant cycle. By such means, the active grant map always contains the most current usage data and the time taken for the PLOAM builder 440 to process the active grant map does not require the added overhead of obtaining CPU updates.

Figure 5:
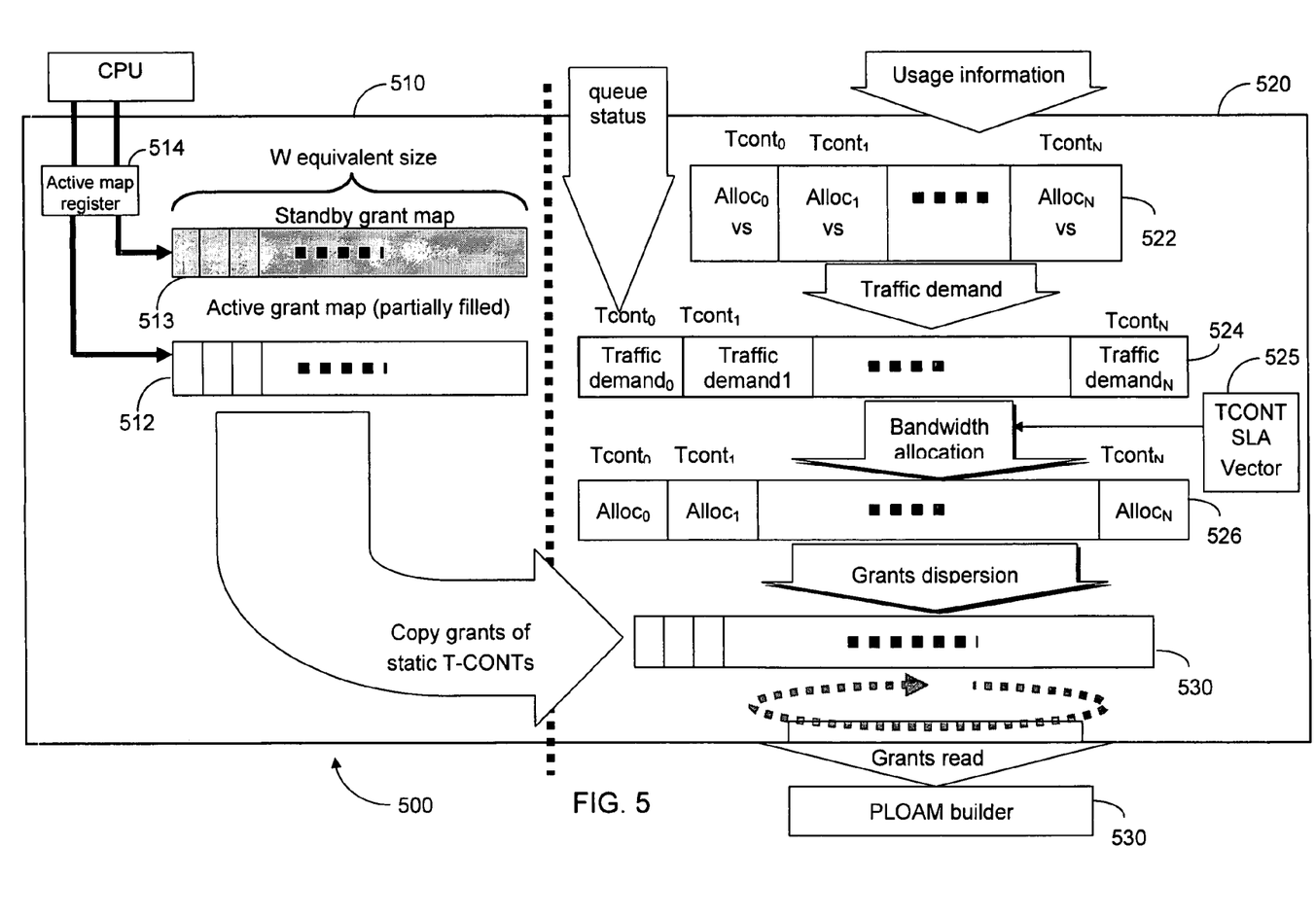
FIG. 5 shows schematically the manner in which data is processed according to the invention.

Referring to FIG. 5, there is shown a non-limiting diagram of a grant scheduler 500 constructed and operative in accordance with another embodiment of the present invention. Grant scheduler 500 serves the function of creating both a static allocation scheme and a dynamic allocation scheme. Grant scheduler 500 comprises a first processing unit 510 and a second procession unit 520. The first processing unit 510 is used for allocating fixed time slots in a current cycle to a subset of T-CONTs for which fixed bandwidth is required (e.g., for voice channels). These are allocated to the respective time slots in either an active grant map 512 or to a standby grant map 513 depending on the status of the active map register 514.

Since the total bandwidth allocation of the T-CONT is known, this allows computation of the remaining bandwidth by subtracting from the total bandwidth allocation the sum of the fixed bandwidth allocated for the PON management and the fixed bandwidth time slots. The difference corresponds to remaining bandwidth that may now be allocated dynamically to non-fixed T-CONT types. Specifically, the remaining available bandwidth is allocated to the various T-CONTs in the following order: assured bandwidth, non-assured bandwidth, and best effort bandwidth, or to a T-CONT that includes any combination of the above traffic types. The dynamic allocation is performed by the second processing unit 520 by utilizing one of the status report or predictive DBA mechanisms mentioned in detail above. To this end, a traffic usage vector 522 determines the actual bandwidth (i.e., non-IDLE cells) used by each T-CONT. The output of the traffic usage vector 522 is combined with queue status reports received from the ONU to a demand traffic vector 524. That is, vector 524 contains the bandwidth needs of each T-CONT. Based on the content of the demand traffic vector 524 and based on the T-CONT's service level agreement (SLA) vector 525, the number of grants (from the available grants) for each T-CONT is determined. Grants vector 526 includes the number of grants allocated per T-CONT. Grants for fixed T-CONTs set by the first processing unit 510 and grants for non-fixed T-CONTs assigned by the second processing unit 520 are merged into an actual grant map 530. The size of the actual grant map 530 is programmable and equal to the size of the active and standby maps. The size of each grant map is equivalent to a time window W. The actual grant map 530 is read by the PLOAM builder 540 for the purpose of forming a grant vector (e.g., vector 300). The time taken for the PLOAM builder to read the entire actual grant map 530 is equal to the time window W.

Figure 6:
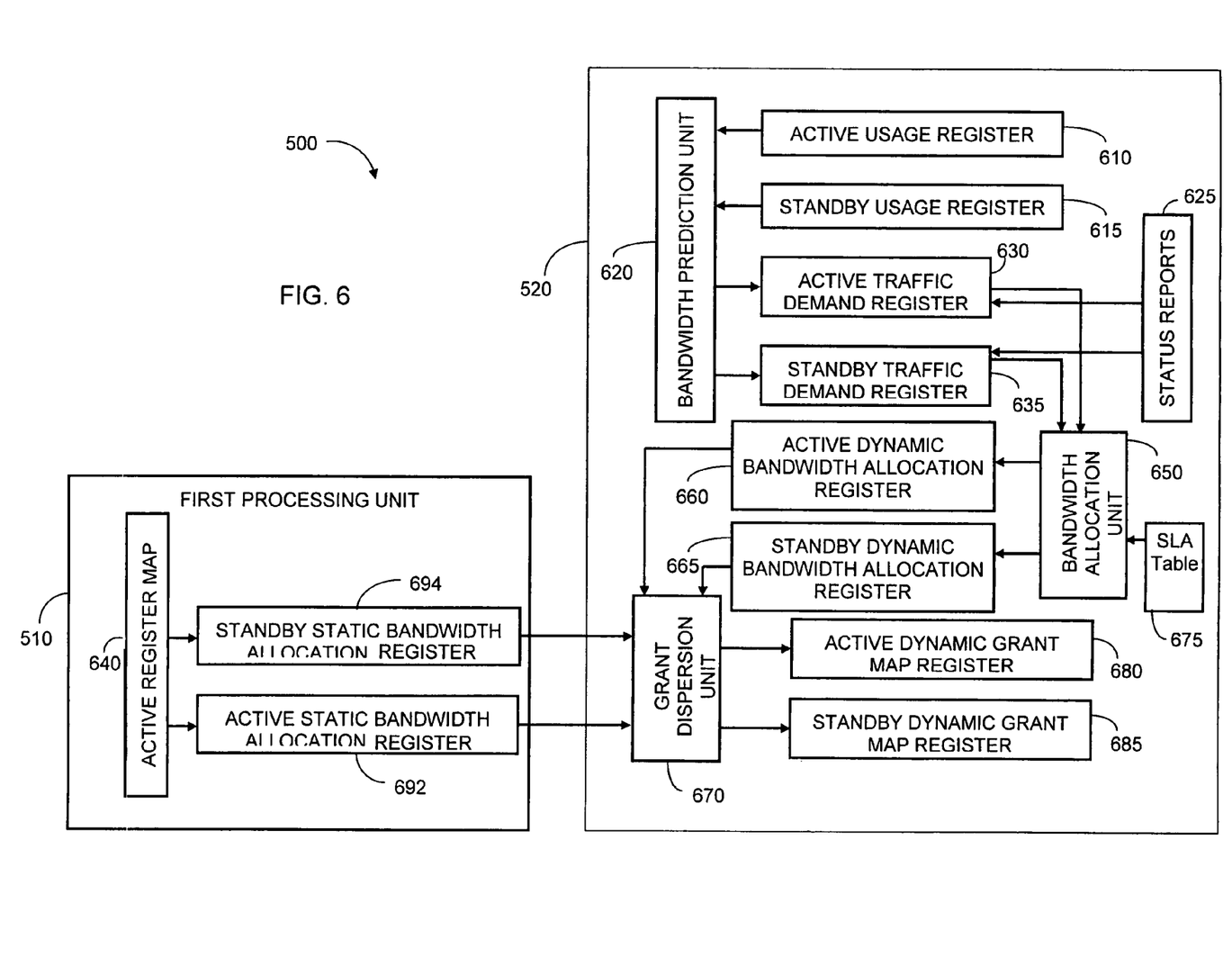
FIG. 6 is a block diagram showing functionally an improved grant scheduler according to the invention.

Referring to FIG. 6, there is shown a non-limiting detailed functional diagram of grant schedule 500 of FIG. 5. The first processing unit 510 statically allocates time slots in a grant cycle to a subset of T-CONTs for which fixed bandwidth is required. Allocations are performed either to the active grant map stored in an active static grant map register 692 or to the standby grant map stored in a standby static grant map register 694 depending on the status of an active map register 640. While this is being done, the second processing unit 520 operates in parallel with the processing unit 510 in order to dynamically allocate time slot to T-CONTs for which fixed bandwidth is not required.

The second processing unit 520 includes an active usage register 610 and a standby usage register 615 for storing usage data conveyed by the ONUs, the usage data being fed to the currently active usage register in accordance with the setting of the active map register 640. Respective outputs of the active usage register 610 and the standby usage register 615 are fed to a bandwidth prediction unit 620, which predicts the bandwidth allocation required by each of the ONUs during the next grant cycle and feeds the predicted allocation data to an active traffic demand register 630. A standby traffic demand register 635 is also provided for receiving the predicted allocation data during the part of the cycle that the active traffic demand register 630 is locked as is the case when the predicted allocation data is being processed. Such processing is performed by a bandwidth allocation unit 650 coupled to the respective outputs of the active traffic demand register 630 and the standby traffic demand register 635. Furthermore, whichever of the active demand register 630 or the standby demand register 635 is currently active is fed with queue status reports of the T-CONTs as provided by a status report processing unit 625. The processing unit 625 receives the queue status of a subset of T-CONTs as reported by those of the ONUs 120 that support SR-DBA, processes this information and feeds the processed results in the currently active traffic demand register (i.e., register 630 or 635).

In a similar manner an active dynamic bandwidth allocation register 660 and a standby dynamic bandwidth allocation register 665 are coupled to a bandwidth allocation unit 650 that stores bandwidth allocation data in the currently active dynamic bandwidth allocation register. Outputs of the active dynamic bandwidth allocation register 660 and the standby dynamic bandwidth allocation register 665 are coupled to a grant dispersion unit 670, whose outputs are coupled to an active dynamic grant register 680 and a standby dynamic grant register 685. The outputs of the active static bandwidth allocation register 692 and the standby static bandwidth allocation register 694 are also fed to grant dispersion unit 670, which combines the currently active static bandwidth allocation register 692 or 694 with the currently active dynamic bandwidth allocation register 660 or 665 so as to produce a final grant map that is embedded in the grant vector as described above with reference to FIG. 3 of the drawings.

The bandwidth allocation unit 650 is thus indirectly coupled to both the first processing unit 510 and the second processing unit 520 for allocating time slots in the current cycle to the remaining subset of the optical network units in response to bandwidth demand as determined by the bandwidth prediction unit 620 for the remaining subset of the optical network units in the current cycle.

The bandwidth allocation to T-CONTs determined by the bandwidth allocation unit 650 is independent of whether the traffic demand is derived from traffic demand prediction based upon usage information, or from status reports provided by those channels that are configured to provide status reports. In the case that it is based on status reports, the incoming status reports may be processed by software (i.e., externally to the second processing unit 520) in conventional manner and the resulting demand predicted for the next grant cycle can then be fed directly to the currently active traffic demand register 630. Therefore, the second processor unit 520 receives the predicted bandwidth to be allocated in the current grant cycle without any latency. This allows performing dynamic bandwidth allocation, based on both SR-DBA and non SR-DBA, using a single processor. It will be appreciated by a person skilled in the art that in practice such an approach significantly speeds up bandwidth allocation since the overall hardware processing time is in the order of 15 μs as opposed to 2 ms taken by hitherto proposed systems, which are software rather than hardware controlled. The shorter process time in turn enables very short grant-cycles.

An SLA table 675 is used for storing SLAs relating to each T-CONTs on the basis of which the bandwidth allocation unit 650 determines how much bandwidth to allocate. SLA may include parameters such as the T-CONT assured bandwidth, non-assured bandwidth, and maximum bandwidth. SLA table 675 may include two separate registers (not shown) for storing active and standby SLAs, thus allowing SLAs associated with one or more T-CONTs to be changed without interfering with the bandwidth allocation of the current grant cycle and allowing automatic switching during the next grant cycle so that the new SLAs then take effect. Such switching is performed by or under the control of the active map register 640. Bandwidth allocation unit 650 thus allocates bandwidth out of the available bandwidth based on the SLAs data stored in SLA table 675 and the traffic demand determined by the current active traffic demand register. The available bandwidth is pre-determined according to the OLT's constraints (e.g., the maximum bandwidth of channel connected to the OLT).

Figure 7:
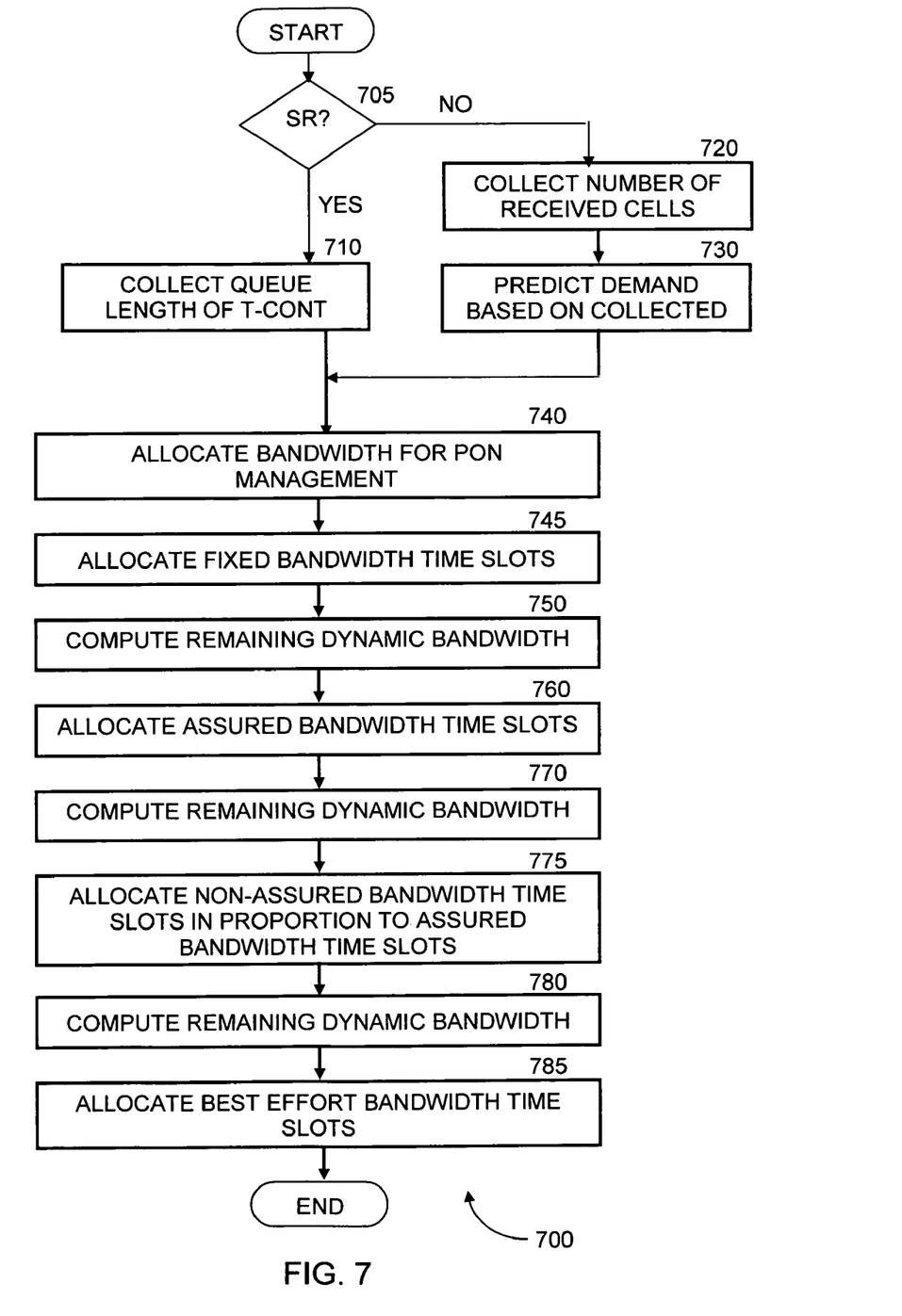
FIG. 7 is a simplified flow diagram showing the principal operating steps carried out by the bandwidth allocation unit in FIG. 6.

FIG. 7 shows a non-limiting and exemplary flowchart 700 describing the principal operating steps carried out by bandwidth allocation unit 650 periodically, at each grant cycle. The bandwidth allocation is performed either based on a status report mechanism or using the predicative mechanism. At 705, a check is made to determine if a status report is received for a given T-CONT. If so, at 710, for each grant cycle, the queue length of a T-CONT buffer is collected. If not, then at 720, the number of received cells (i.e., non-IDEL cells) versus allocated time slots is accumulated and immediately after at 730, based on the collected data, dynamic demand is predicted using any suitable algorithm.

At 740, fixed bandwidth is allocated for the PON management. Likewise, at 745, fixed bandwidth may be allocated for the fixed (guaranteed) bandwidth time slots allocated by the first processing unit 510. Since the total available bandwidth allocation of the T-CONT is known, this allows computing the remaining bandwidth by subtracting from the total available bandwidth allocation the sum of the fixed bandwidth allocated for the PON management and the fixed bandwidth time slots (750). The difference corresponds to remaining available bandwidth that may now be dynamically allocated by the second procession unit 520. At 760, from the available remaining bandwidth, the assured bandwidth time slots are first allocated. The assured bandwidth is allocated only when the corresponding T-CONTs demand bandwidth. In practice, at least one time slot is allocated to each T-CONT to enable each T-CONT to transmit data. A T-CONT that does not transmit any data during its allocation is indicative of no bandwidth demand.

At 770, the remaining available 'dynamic' bandwidth is computed and from this remaining bandwidth, at 775, non-assured bandwidth allocation time slots are allocated to those T-CONTs with excess demand identified as 'non-assured' bandwidth. The bandwidth allocated to such T-CONTs may be in proportion to the bandwidth allocated to the assured bandwidth time slots. Finally, at 780 and 785, the remaining bandwidth is divided among those cells identified as 'best effort' bandwidth cells.

It will be appreciated by a person skilled in the art that different algorithms may be used to compute bandwidth allocation. The essence of the invention resides in the parallel processing of the fixed and dynamic bandwidth allocation, allowing fixed bandwidth allocation to be computed using a software-programmed CPU while the dynamic bandwidth allocation is determined using suitably programmed firmware or a hardware circuit. As a result, the CPU is relieved of heavy duty processing needed for dynamic bandwidth allocation, which is computed at frequency much faster than would be the case if all the bandwidth allocation were software-programmed. On the other hand, the configuration of the hardware programmed processing unit allows for flexible integration with the CPU and owing to the provision of active and standby registers which are easily toggled between successive grant cycles, allows virtually instantaneous changes in bandwidth usage and SLAs to be recognized.

The invention claimed is:

1. A method for cyclically allocating time slots to a plurality of traffic containers (T-CONTs) each included in one or more optical network units (ONUs) for transmitting respective data based on known respective service level agreements for each of said T-CONTs, said method performs by a grand scheduler, comprising:
   allocating fixed time slots in a current cycle to a fixed subset of T-CONTs;
   receiving at least one of a status report and usage information relating to a non-fixed subset of T-CONTs;
   determining bandwidth demand for each T-CONT in said non-fixed subset of T-CONTs based on said at least one of said status report and said usage information;
   predicting bandwidth demand for each T-CONT in said non-fixed subset of T-CONTs based on at least usage information;
   dynamically allocating time slots in the current cycle to said non-fixed subset of T-CONTs based on bandwidth availability, the predicted bandwidth demand, and the determined bandwidth demand; and
   combining said fixed allocated time slots and the dynamically allocated time slots into a grant vector.

2. The method of claim 1, wherein for each T-CONT in said non-fixed subset of T-CONTs a non-fixed bandwidth is required.

3. The method of claim 2, further including associating a service level agreement parameter with each T-CONT in said non-fixed subset of T-CONTs, said service level agreement parameter including at least one of: an assured bandwidth, a non-assured bandwidth, a best effort bandwidth, a combination thereof.

4. The method of claim 1, wherein for each T-CONT in said fixed subset of T-CONTs a fixed bandwidth is required.

5. The method of claim 1, wherein each of said ONUs comprises at least one T-CONT.

6. The method of claim 1, further including allocating said time slots to respective entries in an active grant map that is constructed during each cycle.

7. The method of claim 6, further including maintaining a standby grant map of allocated time slots and switching between the active grant map and the standby grant map during successive cycles.

8. The method of claim 6, wherein the size of each of said active grant map and said standby grant map is a programmable parameter.

9. The method of claim 6, wherein allocating said fixed time slots includes allocating said fixed time slots to respective entries in the active grant map.

10. The method of claim 9, wherein allocating time slots in the current cycle to said non-fixed subset of T-CONTs includes:
    allocating time slots to a remaining subset of entries in the active grant map.

11. The method of claim 10, further including:
    computing a remaining available bandwidth; and
    allocating said remaining available bandwidth to T-CONTs in said non-fixed subset of T-CONTs in an order determined by types of said T-CONTs.

12. The method of claim 10, wherein said remaining available bandwidth is allocated to the T-CONTs according to the following order: an assured bandwidth of T-CONT, a non-assured bandwidth of T-CONT, a best effort bandwidth of T-CONT.

13. A grant scheduler for cyclically allocating time slots to a plurality of traffic containers (T-CONTs) included in one or more optical network units (ONUs) for transmitting respective data based on known respective service level agreements for each of said T-CONTs, said grant scheduler comprising:
- a first processing unit for allocating fixed time slots in a current cycle to a fixed subset of T-CONTs;
- a second processing unit for determining bandwidth demand for each T-CONT in a non-fixed subset of T-CONTs based on a dynamic bandwidth allocation input;
- a bandwidth predicting unit for predicting the bandwidth demand for each T-CONTs of said non-fixed subset of T-CONTs responsive to at least usage information received from selected T-CONTs of said non-fixed subset of T-CONTs:
- a bandwidth allocation unit coupled to said first processing unit and to said second processing unit for dynamically allocating time slots in the current cycle to said non-fixed subset of T-CONTs based on the determined bandwidth demand, the predicted bandwidth demand, and bandwidth availability; and
- a grant dispersion unit for combining said fixed allocated time slots and the dynamically allocated time slots into a grant vector.

14. The grant scheduler of claim 13, wherein for each T-CONT in said fixed subset of T-CONTs a fixed bandwidth is required.

15. The grant scheduler of claim 13, wherein for each T-CONT in said non-fixed subset of T-CONTs a non-fixed bandwidth is required.

16. The grant scheduler of claim 15, wherein each T-CONT in said non-fixed subset of T-CONTs is associated with a service level agreement parameter including at least one of: an assured bandwidth, a non-assured bandwidth, a best effort bandwidth, a combination thereof.

17. The grant scheduler of claim 13, wherein said dynamic bandwidth allocation input includes at least one of: usage information and a status reports.

18. The grant scheduler of claim 13, wherein said second processing unit operates independently of said first processing unit.

19. The grant scheduler of claim 17, wherein said second processing unit includes: a status report bandwidth unit responsive to the status reports received from selected T-CONTs of said non-fixed subset of T-CONTs for determining the respective bandwidth demand for each of said selected T-CONTs in the current cycle.

20. The grant scheduler of claim 13, further including a memory for storing an active grant map constructed during each cycle and respective entries of which grant map are allocated said time slots.

21. The grant scheduler of claim 20, wherein said memory further stores a standby grant map of allocated time slots.

22. The grant scheduler of claim 21, wherein said grant scheduler further includes an active map register for switching between the active grant map and the standby grant map during successive cycles or upon updates in standby grant map.

23. The grant scheduler of claim 22, wherein: said first processing unit is adapted to allocate the fixed time slots to respective entries in the active grant map; and said first processing unit is adapted to allocate time slots in the current cycle to a remaining subset of entries in the active grant map based on the determined bandwidth demand and the bandwidth availability.

24. The grant scheduler of claim 23, wherein the size of each of said grant maps is programmable.

25. The grant scheduler of claim 13, wherein said first processing unit is adapted to operate in response to programmed software instructions and said second processing unit is hardware programmed.

\* \* \* \* \*

UNITED STATES PATENT AND TRADEMARK OFFICE
CERTIFICATE OF CORRECTION

PATENT NO. : 7,573,897 B2 Page 1 of 1
APPLICATION NO. : 11/107906
DATED : August 11, 2009
INVENTOR(S) : Eli Elmoalem, Yehiel Angel and David Avishai It is certified that error appears in the above-identified patent and that said Letters Patent is hereby corrected as shown below:

Title page, item (75) should be

(75) Inventors: Eli Elmoalem, Nili (IL); Yehiel Angel, Tserufa (IL); David Avishai, Nes Ziona (IL)

Title page, item (74), col. 2 should be:

(74) Attorney, Agent or Firm - Myers Wolin, LLC

Signed and Sealed this

Twenty-ninth Day of September, 2009

David J. Kappos
*Director of the United States Patent and Trademark Office*